(12) United States Patent  
Idogawa et al.

(10) Patent No.: US 11,746,717 B2  
(45) Date of Patent: Sep. 5, 2023

(54) ENGINE APPARATUS

(71) Applicant: TOYOTA JIDOSHA KABUSHIKI KAISHA, Aichi-ken (JP)

(72) Inventors: Masanao Idogawa, Nagoya (JP); Takahiro Uchida, Okazaki (JP); Masahiro Kachi, Nagakute (JP); Reiko Goh, Toyota (JP); Hirokatsu Yamamoto, Chita (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/344,953

(22) Filed: Jun. 11, 2021

(65) Prior Publication Data

US 2021/0388782 A1 Dec. 16, 2021

(30) Foreign Application Priority Data

Jun. 15, 2020 (JP) .................................. 2020-103238

(51) Int. Cl.

| | |
|---|---|
| *F02D 41/00* | (2006.01) |
| *F02M 25/08* | (2006.01) |
| *F02D 41/14* | (2006.01) |

(52) U.S. Cl.

CPC ....... *F02D 41/004* (2013.01); *F02D 41/0007* (2013.01); *F02D 41/0045* (2013.01); *F02M 25/089* (2013.01); *F02M 25/0827* (2013.01); *F02M 25/0836* (2013.01); *F02D 2041/1431* (2013.01)

(58) Field of Classification Search

CPC ............... F02D 41/004; F02D 41/0007; F02D 41/0045; F02D 2041/1431; F02M 25/0827; F02M 25/0836; F02M 25/089

See application file for complete search history.

(56) References Cited

U.S. PATENT DOCUMENTS

| | | | | | |
|---|---|---|---|---|---|
| 3,461,445 | A | * | 8/1969 | Luehrmann | ............... H04Q 9/00 340/12.55 |
| 5,476,081 | A | * | 12/1995 | Okawa | .................... F02M 25/08 123/480 |
| 2013/0199504 | A1 | * | 8/2013 | Takeishi | ............. F02M 25/0809 123/520 |
| 2013/0220282 | A1 | * | 8/2013 | Hadre | ................ F02M 25/0836 123/520 |

(Continued)

FOREIGN PATENT DOCUMENTS

| | | |
|---|---|---|
| JP | 2018-13111 A | 1/2018 |
| JP | 2018-96247 A | 6/2018 |

(Continued)

*Primary Examiner* — Phutthiwat Wongwian  
*Assistant Examiner* — Susan E Scharpf  
(74) *Attorney, Agent, or Firm* — HAUPTMAN HAM, LLP

(57) ABSTRACT

A first arrival flow rate that is a flow rate of evaporative fuel gas that has arrived in a throttle downstream portion located downstream of a throttle valve in an intake pipe via a second purge passage after passing through a purge control valve is estimated based on a valve passage flow rate that is a flow rate of evaporative fuel gas that has passed through the purge control valve, and a first response delay in the flow of evaporative fuel gas through a route extending from the purge control valve to the throttle downstream portion via the second purge passage.

6 Claims, 8 Drawing Sheets

(56) References Cited

U.S. PATENT DOCUMENTS

| | | | | |
|---|---|---|---|---|
| 2014/0251285 A1* | 9/2014 | Surnilla | ............. | F02D 41/0045 |
| | | | | 123/568.11 |
| 2014/0257672 A1* | 9/2014 | Surnilla | ............. | F02D 41/1454 |
| | | | | 701/103 |
| 2018/0163646 A1* | 6/2018 | Tsutsumi | ......... | F02M 35/10222 |
| 2020/0025156 A1* | 1/2020 | Mizushima | ........ | F02M 25/0836 |
| 2020/0109674 A1* | 4/2020 | Lee | ...................... | F02D 41/004 |

FOREIGN PATENT DOCUMENTS

| JP | 2018-178816 A | 11/2018 |
|---|---|---|
| JP | 201952561 A | 4/2019 |

\* cited by examiner

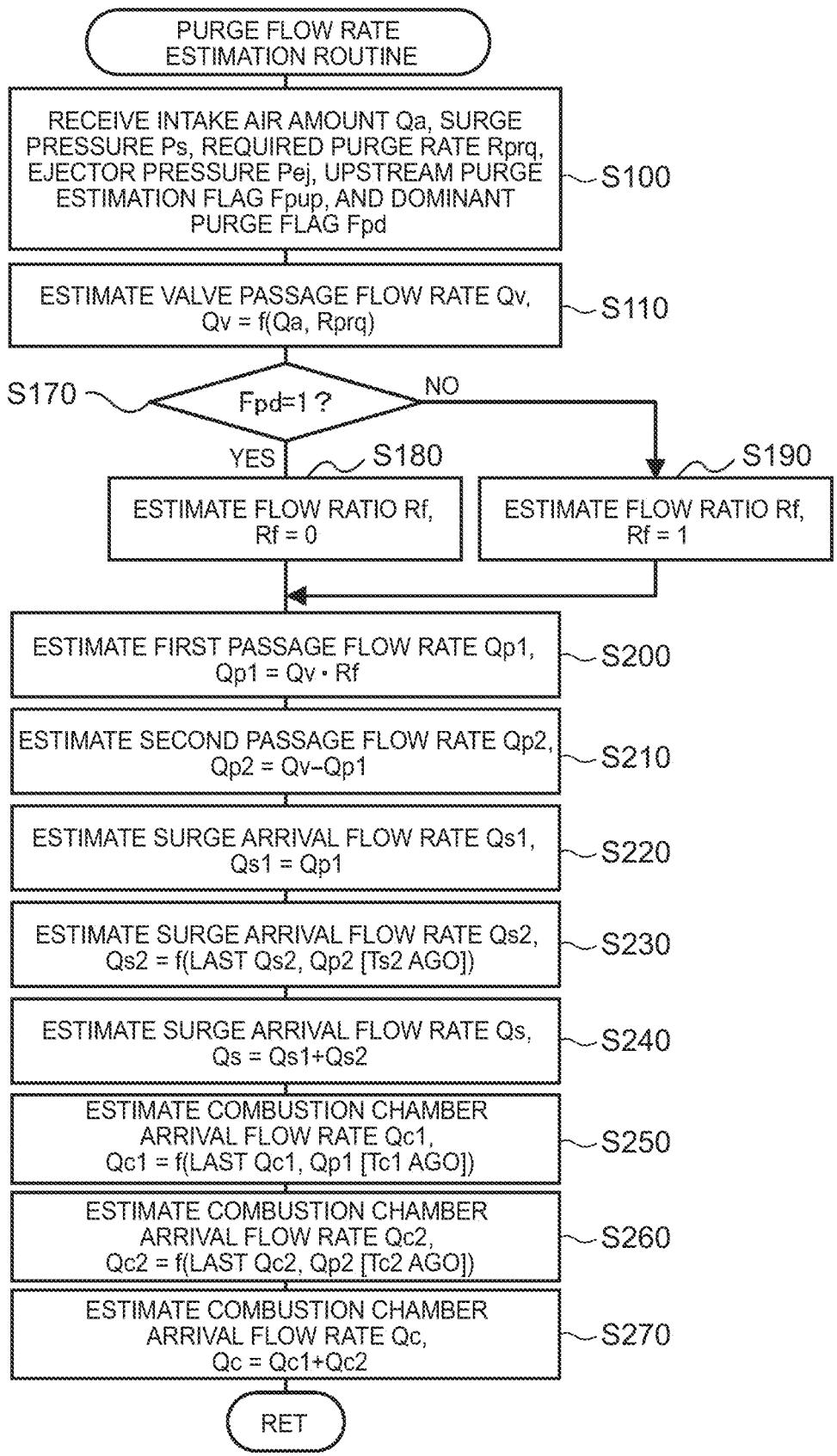

ENGINE APPARATUS

CROSS-REFERENCE TO RELATED APPLICATION

This application claims priority to Japanese Patent Application No. 2020-103238 filed on Jun. 15, 2020, incorporated herein by reference in its entirety.

BACKGROUND

1. Technical Field

The present disclosure relates to an engine apparatus.

2. Description of Related Art

Conventionally, as this kind of engine apparatus, there is proposed an engine apparatus that is equipped with a first purge passage for purging evaporative fuel gas containing evaporative fuel downstream of a throttle valve in an intake pipe of an engine, a second purge passage for purging evaporative fuel gas upstream of a compressor of a supercharger in the intake pipe by an ejector that generates a negative pressure through the use of a supercharging pressure from the supercharger, a supply passage for supplying evaporative fuel gas produced in a fuel tank to the first purge passage and the second purge passage, and a purge control valve provided in the supply passage (e.g., see Japanese Unexamined Patent Application Publication No. 2019-052561 (JP 2019-052561 A)). In this engine apparatus, the pressure downstream of the throttle valve in the intake pipe and the pressure generated by the ejector are compared with each other, and it is detected whether purge is carried out via the first purge passage or the second purge passage.

SUMMARY

In this engine apparatus, when purge is carried out via the second purge passage, the route volume of a route extending from the purge control valve to a throttle downstream portion located downstream of the throttle valve in the intake pipe via the second purge passage is large, so the flow rate of evaporative fuel gas that has passed through the purge control valve and the flow rate of evaporative fuel gas that has arrived in the throttle downstream portion are not always equal to each other at the same timing. Therefore, there have been demands to more appropriately estimate the flow rate of evaporative fuel gas that has arrived in the throttle downstream portion via the second purge passage after passing through the purge control valve.

It is a main object of an engine apparatus of the present disclosure to more appropriately estimate the flow rate of evaporative fuel gas that has arrived in the throttle downstream portion via the second purge passage after passing through the purge control valve.

The engine apparatus of the present disclosure has adopted the following means to achieve the foregoing main object.

The engine apparatus of the present disclosure is equipped with an engine that has a throttle valve arranged in an intake pipe and that outputs motive power through explosive combustion in a combustion chamber through the use of fuel supplied from a fuel tank, a supercharger that has a compressor arranged upstream of the throttle valve in the intake pipe, an evaporative fuel treatment device that has a supply passage through which evaporative fuel gas containing evaporative fuel produced in the fuel tank is supplied to the intake pipe in such a manner as to branch off into a first purge passage and a second purge passage that are connected to the intake pipe downstream of the throttle valve, an ejector having an intake port that is connected to a recirculation passage extending from the intake pipe between the compressor and the throttle valve, an exhaust port that is connected to the intake pipe upstream of the compressor, and a suction port that is connected to the second purge passage, and a purge control valve provided in the supply passage, and a control device. The control device estimates a first arrival flow rate that is a flow rate of the evaporative fuel gas that has arrived in a throttle downstream portion located downstream of the throttle valve in the intake pipe, via the second purge passage, after passing through the purge control valve, based on a valve passage flow rate that is a flow rate of the evaporative fuel gas that has passed through the purge control valve, and a first response delay in the flow of the evaporative fuel gas through a route extending from the purge control valve to the throttle downstream portion via the second purge passage.

In the engine apparatus of the present disclosure, the first arrival flow rate that is the flow rate of the evaporative fuel gas that has arrived in the throttle downstream portion located downstream of the throttle valve in the intake pipe via the second purge passage after passing through the purge control valve is estimated based on the valve passage flow rate that is the flow rate of the evaporative fuel gas that has passed through the purge control valve, and the first response delay in the flow of the evaporative fuel gas through the route extending from the purge control valve to the throttle downstream portion via the second purge passage. Accordingly, the first arrival flow rate can be more appropriately (more accurately) estimated by taking the first response delay into account.

In the engine apparatus of the present disclosure, the control device may estimate a second passage flow rate that is a flow rate of the evaporative fuel gas flowing through the second purge passage after passing through the purge control valve, based on a relationship between a post-throttle pressure that is a pressure in the throttle downstream portion and an ejector pressure that is a pressure at the suction port of the ejector, and the valve passage flow rate, and estimate the first arrival flow rate based on the second passage flow rate and the first response delay, when the evaporative fuel gas that has passed through the purge control valve flows through the first purge passage and the second purge passage. Accordingly, the first arrival flow rate can be still more appropriately estimated by taking the second passage flow rate based on the valve passage flow rate into account. In this case, the control device may estimate that the evaporative fuel gas that has passed through the purge control valve flows through the first purge passage and the second purge passage, when the post-throttle pressure and the ejector pressure are negative pressures.

In the engine apparatus of the present disclosure, the control device may estimate a second arrival flow rate that is a flow rate of the evaporative fuel gas that has arrived in the throttle downstream portion via the first purge passage after passing through the purge control valve, based on the valve passage flow rate, without taking a response delay in the flow of the evaporative fuel gas into account. In this manner, the second arrival flow rate can be easily estimated. This method is especially useful when the route volume of the route extending from the purge control valve to the throttle downstream portion via the first purge passage is small enough to be able to ignore the response delay in the flow of evaporative fuel gas.

In the engine apparatus of the present disclosure, the control device may estimate a second arrival flow rate that is a flow rate of the evaporative fuel gas that has arrived in the throttle downstream portion via the first purge passage after passing through the purge control valve, based on the valve passage flow rate, and a second response delay in the flow of the evaporative fuel gas through a route extending from the purge control valve to the throttle downstream portion via the first purge passage. Accordingly, the second arrival flow rate can be more appropriately estimated by taking the second response delay into account.

In the engine apparatus of the present disclosure according to the aspect in which the second arrival flow rate is estimated, the control device may estimate a first passage flow rate that is a flow rate of the evaporative fuel gas flowing through the first purge passage after passing through the purge control valve, based on a relationship between a post-throttle pressure that is a pressure in the throttle downstream portion and an ejector pressure that is a pressure at the suction port of the ejector, and the valve passage flow rate, and estimate the second arrival flow rate based on the first passage flow rate, when the evaporative fuel gas that has passed through the purge control valve flows through the first purge passage and the second purge passage. Accordingly, the second arrival flow rate can be still more appropriately estimated by taking the first passage flow rate based on the valve passage flow rate into account. In this case, the control device may estimate that the evaporative fuel gas that has passed through the purge control valve flows through the first purge passage and the second purge passage, when the post-throttle pressure and the ejector pressure are negative pressures.

In the engine apparatus of the present disclosure, the control device may estimate a third arrival flow rate that is a flow rate of the evaporative fuel gas that has arrived in the combustion chamber via the first purge passage after passing through the purge control valve, based on the valve passage flow rate, and a third response delay in the flow of the evaporative fuel gas through a route extending from the purge control valve to the combustion chamber via the first purge passage, and estimate a fourth arrival flow rate that is a flow rate of the evaporative fuel gas that has arrived in the combustion chamber via the second purge passage after passing the purge control valve, based on the valve passage flow rate and a fourth response delay in the flow of the evaporative fuel gas through a route extending from the purge control valve to the combustion chamber via the second purge passage. Accordingly, the third arrival flow rate and the fourth arrival flow rate can be more appropriately estimated by taking the third response delay and the fourth response delay into account respectively.

In the engine apparatus of the present disclosure according to the aspect in which the third arrival flow rate and the fourth arrival flow rate are estimated, the control device may estimate a first passage flow rate and a second passage flow rate that are flow rates of the evaporative fuel gas flowing through the first purge passage and the second purge passage respectively after passing through the purge control valve, based on a relationship between a post-throttle pressure that is a pressure in the throttle downstream portion and an ejector pressure that is a pressure at the suction port of the ejector, and the valve passage flow rate, estimate the third arrival flow rate based on the first passage flow rate and the third response delay, and estimate the fourth arrival flow rate based on the second passage flow rate and the fourth response delay, when the evaporative fuel gas that has passed through the purge control valve flows through the first purge passage and the second purge passage. Accordingly, the third arrival flow rate and the fourth arrival flow rate can be still more appropriately estimated by taking the first passage flow rate and the second passage flow rate that are based on the valve passage flow rate into account. In this case, the control device may estimate that the evaporative fuel gas that has passed through the purge control valve flows through the first purge passage and the second purge passage, when the post-throttle pressure and the ejector pressure are negative pressures.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 11 is a flowchart showing an example of a purge flow rate estimation routine.

DETAILED DESCRIPTION OF EMBODIMENTS

Next, a mode for carrying out the present disclosure will be described using one of embodiments.

Figure 1:
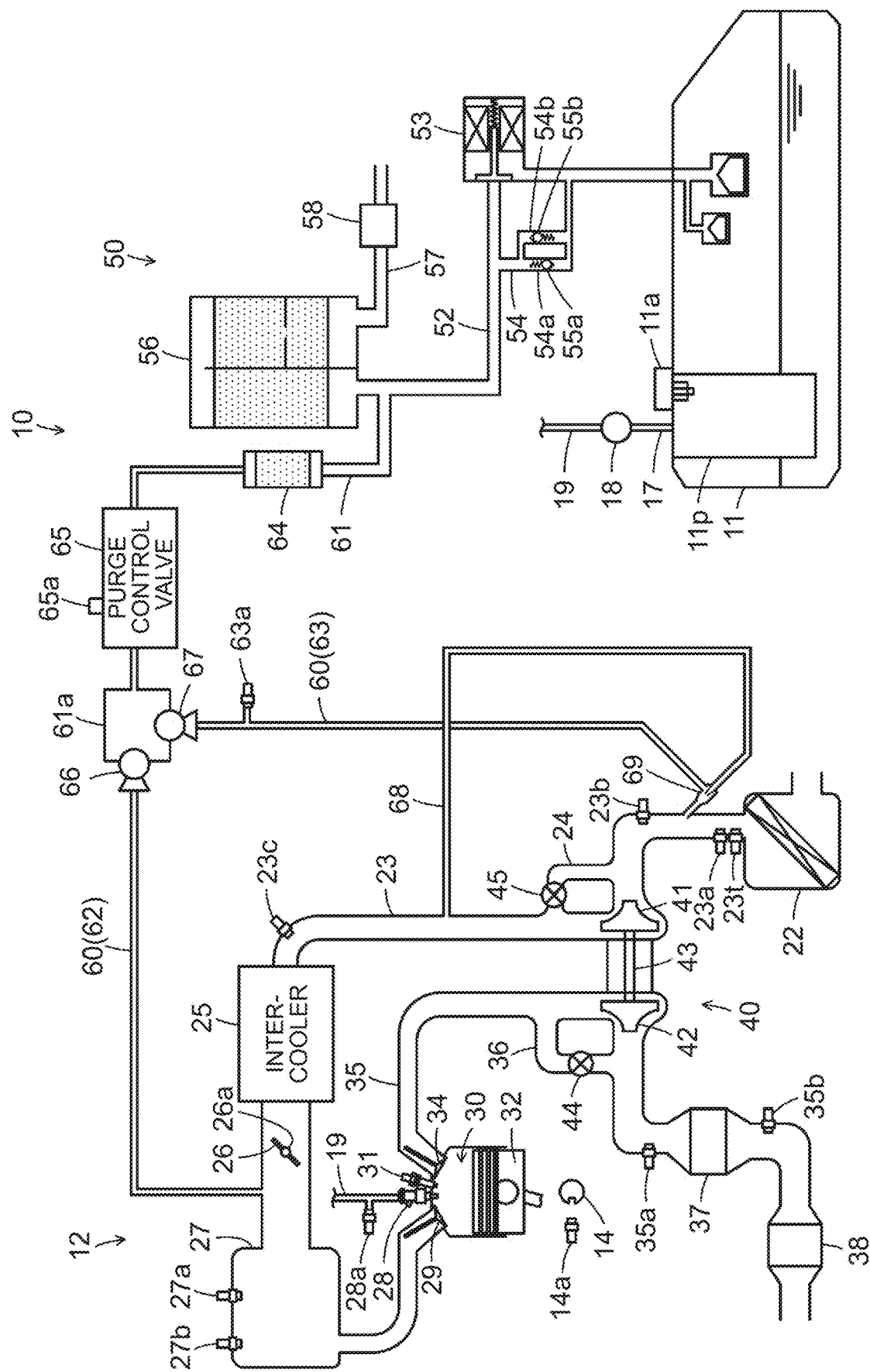
FIG. 1 is a configuration view showing the outline of the configuration of an engine apparatus 10 of the present disclosure.
Figure 2:
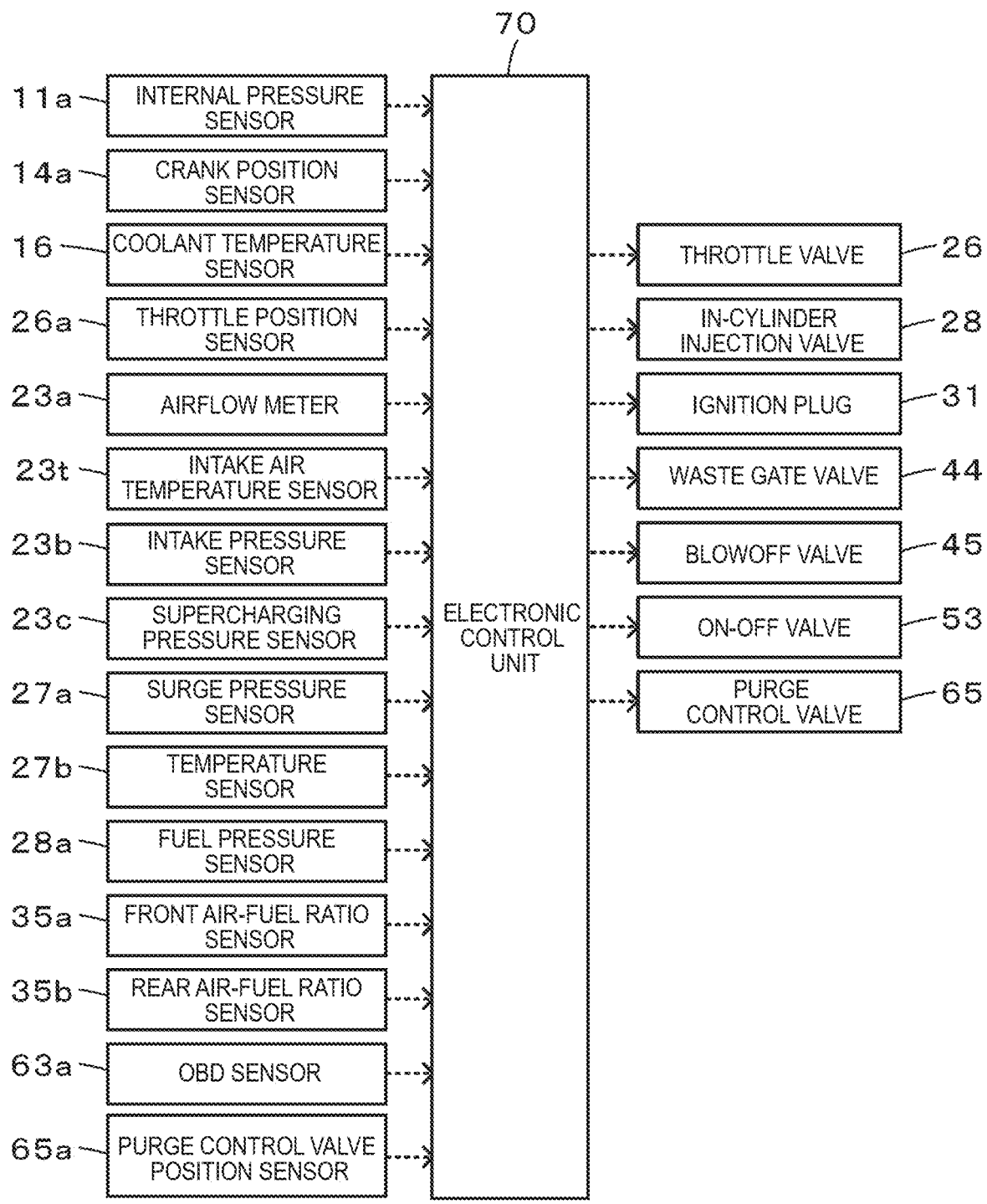
FIG. 2 is an illustrative view showing an example of signals input to and output from an electronic control unit 70.

FIG. 1 is a configuration view showing the outline of the configuration of an engine apparatus 10 as one of the embodiments of the present disclosure. FIG. 2 is an illustrative view showing an example of signals input to and output from an electronic control unit 70. The engine apparatus 10 of the embodiment is mounted in common vehicles that run through the use of motive power from an engine 12, and various hybrid vehicles that are equipped with a motor as well as the engine 12. As shown in FIG. 1 and FIG. 2, the engine apparatus 10 is equipped with the engine 12, a supercharger 40, an evaporative fuel treatment device 50, and the electronic control unit 70.

The engine 12 is configured as an internal combustion engine that outputs motive power through the use of a fuel such as gasoline or light oil that is supplied from a fuel tank 11. The engine 12 sucks the air cleaned by an air cleaner 22 to an intake pipe 23, and causes this air to pass through an intercooler 25, a throttle valve 26 and a surge tank 27 in this order. The engine 12 then injects fuel into the air sucked into a combustion chamber 30 via an intake valve 29, from an in-cylinder injection valve 28 attached to the combustion chamber 30, thereby mixes the air and the fuel with each other, and burns the air-fuel mixture in an explosive manner through the use of electric sparks produced by an ignition plug 31. The engine 12 converts reciprocating motion of a piston 32 that is depressed by the energy resulting from this explosive combustion into rotational motion of a crankshaft 14. The exhaust gas that is discharged from the combustion chamber 30 to an exhaust pipe 35 via an exhaust valve 34 is discharged to outside air via emission control devices 37 and 38 having catalysts (three-way catalysts) for removing noxious components such as carbon monoxide (CO), hydrocarbons (HC), and nitrogen oxides (NOx). Incidentally, fuel is supplied from the fuel tank 11 to the in-cylinder injection valve 28 via a feed pump 11p, a low pressure-side fuel passage 17, a high-pressure pump 18, and a high pressure-side fuel passage 19. The high-pressure pump 18 is driven by the motive power from the engine 12, pressurizes the fuel in the low pressure-side fuel passage 17, and supplies this fuel to the high pressure-side fuel passage 19.

The supercharger 40 is configured as a turbocharger, and is equipped with a compressor 41, a turbine 42, a rotary shaft 43, a waste gate valve 44, and a blowoff valve 45. The compressor 41 is arranged upstream of the intercooler 25 in the intake pipe 23. The turbine 42 is arranged upstream of the emission control device 37 in the exhaust pipe 35. The rotary shaft 43 couples the compressor 41 and the turbine 42 to each other. The waste gate valve 44 is provided in a bypass pipe 36 that establishes communication between a region upstream of the turbine 42 in the exhaust pipe 35 and a region downstream of the turbine 42 in the exhaust pipe 35, and is controlled by the electronic control unit 70. The blowoff valve 45 is provided in a bypass pipe 24 that establishes communication between a region upstream of the compressor 41 in the intake pipe 23 and a region downstream of the compressor 41 in the intake pipe 23, and is controlled by the electronic control unit 70.

In this supercharger 40, the distribution ratio between an amount of exhaust gas flowing through the bypass pipe 36 and an amount of exhaust gas flowing through the turbine 42 is adjusted, the rotational driving force of the turbine 42 is adjusted, the amount of air compressed by the compressor 41 is adjusted, and the supercharging pressure (intake pressure) of the engine 12 is adjusted by adjusting the opening degree of the waste gate valve 44. It should be noted herein that the distribution ratio is, more specifically, adjusted such that the amount of exhaust gas flowing through the bypass pipe 36 decreases and the amount of exhaust gas flowing through the turbine 42 increases as the opening degree of the waste gate valve 44 decreases. Incidentally, the engine 12 can operate in the same manner as a natural suction-type engine that is not equipped with the supercharger 40, when the waste gate valve 44 is fully open.

Besides, in the supercharger 40, a surplus pressure downstream of the compressor 41 can be released by opening the blowoff valve 45 when the pressure downstream of the compressor 41 in the intake pipe 23 is higher than the pressure upstream of the compressor 41 in the intake pipe 23 by a certain value. Incidentally, the blowoff valve 45 may be configured as a check valve that opens when the pressure downstream of the compressor 41 in the intake pipe 23 becomes higher than the pressure upstream of the compressor 41 in the intake pipe 23 by a certain value, instead of the valve that is controlled by the electronic control unit 70.

The evaporative fuel treatment device 50 is a device for carrying out purge for supplying the evaporative fuel gas (purge gas) produced in the fuel tank 11 to the intake pipe 23 of the engine 12, and is equipped with an introduction passage 52, an on-off valve 53, a bypass passage 54, relief valves 55a and 55b, a canister 56, a common passage 61, a first purge passage 62, a second purge passage 63, a buffer portion 64, a purge control valve 65, check valves 66 and 67, a recirculation passage 68, and an ejector 69. The introduction passage 52 and the common passage 61 are equivalent to "the supply passage" of the present disclosure.

The introduction passage 52 is connected to the fuel tank 11 and the canister 56. The on-off valve 53 is provided in the introduction passage 52, and is configured as a normally closed-type electromagnetic valve. The on-off valve 53 is controlled by the electronic control unit 70.

The bypass passage 54 bypasses a region of the introduction passage 52 located on the fuel tank 11 side with respect to the on-off valve 53 and a region of the introduction passage 52 located on the canister 56 side with respect to the on-off valve 53, and has two branch portions 54a and 54b into which the bypass passage 54 branches off and which merge into the bypass passage 54. The relief valve 55a is provided in the branch portion 54a, is configured as a check valve, and opens when the pressure on the fuel tank 11 side becomes higher than the pressure on the canister 56 side by a certain value. The relief valve 55b is provided in the branch portion 54b, is configured as a check valve, and opens when the pressure on the canister 56 side becomes higher than the pressure on the fuel tank 11 side by a certain value.

The canister 56 is connected to the introduction passage 52, and is opened to the atmosphere via an atmosphere open passage 57. The inside of the canister 56 is filled with an adsorbent such as activated carbon capable of adsorbing the evaporative fuel from the fuel tank 11. An air filter 58 is provided in the atmosphere open passage 57.

The common passage 61 is connected to the introduction passage 52 in the vicinity of the canister 56, and branches off into the first purge passage 62 and the second purge passage 63 at a branch-off point 61a. The first purge passage 62 is connected to the intake pipe 23 between the throttle valve 26 and the surge tank 27. The second purge passage 63 is connected to the suction port of the ejector 69.

The buffer portion 64 is provided in the common passage 61. The inside of the buffer portion 64 is filled with an adsorbent such as activated carbon capable of adsorbing the evaporative fuel from the fuel tank 11 and the canister 56. The purge control valve 65 is provided in the common passage 61 on the branch-off point 61a side with respect to the buffer portion 64. The purge control valve 65 is configured as a normally closed-type electromagnetic valve. The purge control valve 65 is controlled by the electronic control unit 70.

The check valve 66 is provided in the first purge passage 62 in the vicinity of the branch-off point 61a. The check valve 66 allows evaporative fuel gas (purge gas) containing evaporative fuel to flow from the common passage 61 side to the first purge passage 62 (the intake pipe 23) side in a purge passage 60, and prohibits evaporative fuel gas from flowing in the opposite direction. The check valve 67 is provided in the second purge passage 63 in the vicinity of the branch-off point 61a. The check valve 67 allows evaporative fuel gas to flow from the common passage 61 side to the second purge passage 63 (the ejector 69) side in the purge passage 60, and prohibits evaporative fuel gas from flowing in the opposite direction.

The recirculation passage 68 is connected to the intake pipe 23 between the compressor 41 and the intercooler 25, and to the intake port of the ejector 69. The ejector 69 has the intake port, a suction port, and an exhaust port. The intake port of the ejector 69 is connected to the recirculation passage 68, the suction port of the ejector 69 is connected to the second purge passage 63, and the exhaust port of the ejector 69 is connected to the intake pipe 23 upstream of the compressor 41. A tip of the intake port is formed in a tapered manner.

In the ejector 69, when the supercharger 40 is in operation (when the pressure in the intake pipe 23 between the compressor 41 and the intercooler 25 is a positive pressure), a pressure difference is generated between the intake port and the exhaust port, and recirculated intake air (the intake air recirculated from a region of the intake pipe 23 located downstream of the compressor 41 via the recirculation passage 68) flows from the intake port toward the exhaust port. At this time, recirculated intake air is depressurized at the tip of the intake port, and a negative pressure is generated around the tip. Then, due to the negative pressure, evaporative fuel gas is sucked from the second purge passage 63 via the suction port, and this evaporative fuel gas is supplied, together with recirculated air at the negative pressure, to the intake pipe 23 upstream of the compressor 41 via the exhaust port.

The evaporative fuel treatment device 50 thus configured basically operates as follows. When the pressure (a surge pressure Ps that will be described later) in the intake pipe 23 downstream of the throttle valve 26 is a negative pressure and the on-off valve 53 and the purge control valve 65 are open, the check valve 66 opens, and the evaporative fuel gas (purge gas) produced in the fuel tank 11 and the evaporative fuel gas desorbed from the canister 56 are supplied to the intake pipe 23 downstream of the throttle valve 26 via the introduction passage 52, the common passage 61, and the first purge passage 62. This will be referred to hereinafter as "downstream purge". At this time, if the pressure (a supercharging pressure Pc that will be described later) in the intake pipe 23 between the compressor 41 and the intercooler 25 is a negative pressure or zero, the ejector 69 does not operate, so the check valve 66 does not open.

Besides, when the pressure (the supercharging pressure Pc) in the intake pipe 23 between the compressor 41 and the intercooler 25 is a positive pressure and the on-off valve 53 and the purge control valve 65 are open, the ejector 69 operates, the check valve 67 opens, and evaporative fuel gas is supplied to the intake pipe 23 upstream of the compressor 41 via the introduction passage 52, the common passage 61, the second purge passage 63, and the ejector 69. This will be referred to hereinafter as "upstream purge". At this time, the check valve 66 opens or closes in accordance with the pressure (the surge pressure Ps) in the intake pipe 23 downstream of the throttle valve 26.

Accordingly, in the evaporative fuel treatment device 50, only downstream purge or only upstream purge is carried out or both downstream purge and upstream purge are carried out in accordance with the pressure (the surge pressure Ps) in the intake pipe 23 downstream of the throttle valve 26 and the pressure (the supercharging pressure Pc) in the intake pipe 23 between the compressor 41 and the intercooler 25.

The electronic control unit 70 is configured as a microprocessor mainly constituted of a CPU, and is equipped with a ROM that stores a processing program, a RAM that temporarily stores data, a non-volatile flash memory that stores and retains data, input/output ports, and a communication port as well as the CPU. Signals from various sensors are input to the electronic control unit 70 via the input ports respectively.

As the signals input to the electronic control unit 70, it is possible to mention, for example, a tank internal pressure Ptnk from an internal pressure sensor 11a that detects a pressure in the fuel tank 11, a crank angle θcr from a crank position sensor 14a that detects a rotational position of the crankshaft 14 of the engine 12, a coolant temperature Tw from a coolant temperature sensor 16 that detects a temperature of coolant in the engine 12, and a throttle opening degree TH from a throttle position sensor 26a that detects an opening degree of the throttle valve 26. It is also possible to mention a cam position θca from a cam position sensor (not shown) that detects a rotational position of an intake camshaft for opening/closing the intake valve 29 and a rotational position of an exhaust camshaft for opening/closing the exhaust valve 34. It is also possible to mention an intake air amount Qa from an airflow meter 23a attached to the intake pipe 23 upstream of the compressor 41, an intake air temperature Tin from an intake air temperature sensor 23t attached to the intake pipe 23 upstream of the compressor 41, an intake pressure (an ante-compressor pressure) Pin from an intake pressure sensor 23b attached to the intake pipe 23 upstream of the compressor 41, and the supercharging pressure Pc from a supercharging pressure sensor 23c attached to the intake pipe 23 between the compressor 41 and the intercooler 25. It is also possible to mention the surge pressure (a post-throttle pressure) Ps from a surge pressure sensor 27a attached to the surge tank 27, and a surge temperature Ts from a temperature sensor 27b attached to the surge tank 27. It is also possible to mention a supply fuel pressure Pfd from a fuel pressure sensor 28a that detects a fuel pressure of the fuel supplied to the in-cylinder injection valve 28. It is also possible to mention a front air-fuel ratio AF1 from a front air-fuel ratio sensor 35a attached to the exhaust pipe 35 upstream of the emission control device 37, and a rear air-fuel ratio AF2 from a rear air-fuel ratio sensor 35b attached to the exhaust pipe 35 between the emission control device 37 and the emission control device 38. It is also possible to mention an opening degree Opv of the purge control valve 65 from a purge control valve position sensor 65a, and a sensor signal Pobd from an OBD sensor (a pressure sensor) 63a attached to the second purge passage 63.

Various control signals are output from the electronic control unit 70 via the output ports respectively. As the signals output from the electronic control unit 70, it is possible to mention, for example, a control signal to the throttle valve 26, a control signal to the in-cylinder injection valve 28, and a control signal to the ignition plug 31. It is also possible to mention a control signal to the waste gate valve 44, a control signal to the blowoff valve 45, and a control signal to the on-off valve 53. It is also possible to mention a control signal to the purge control valve 65.

The electronic control unit 70 computes a rotational speed Ne of the engine 12 and a load factor (a ratio of a volume of air actually sucked into the engine 12 per cycle to a cylinder capacity of the engine 12 per cycle) KL of the engine 12. The rotational speed Ne is computed based on the crank angle θcr from the crank position sensor 14a. The load factor KL is computed based on the intake air amount Qa from the airflow meter 23a and the rotational speed Ne.

In the engine apparatus 10 of the embodiment thus configured, the electronic control unit 70 performs intake air amount control for controlling the opening degree of the throttle valve 26, fuel injection control for controlling the amount of fuel injection from the in-cylinder injection valve 28, ignition control for controlling the ignition timing of the ignition plug 31, supercharging control for controlling the opening degree of the waste gate valve 44, and purge control for controlling the opening degree of the purge control valve 65, and the like based on a required load factor KL* of the engine 12.

In intake air amount control, the throttle valve 26 is controlled such that the throttle opening degree TH decreases as the flow rate (the purge flow rate) of evaporative fuel gas supplied to the intake pipe 23 in accordance with the performance of purge control increases. In fuel injection control, the in-cylinder injection valve 28 is controlled such that the amount of fuel injection decreases as the purge flow rate of evaporative fuel gas supplied to the combustion chamber 30 in accordance with the performance of purge control increases (as the front air-fuel ratio AF1 shifts toward the rich side as a result). Purge control is performed when a purge condition is fulfilled. As the purge condition, for example, a condition that operation control of the engine 12 (fuel injection control or the like) is performed and the coolant temperature Tw is equal to or higher than a threshold Twref, or the like is used. For example, a temperature of about 55° C. to 65C° is used as the threshold Twref. In purge control, the purge control valve 65 is controlled through the use of a drive duty Ddr based on a required purge rate Rprq. "The purge rate" means a ratio of the amount of evaporative fuel gas to the amount of intake air. The required purge rate Rprq is set in such a manner as to gradually increase from a start purge rate Rpst1 or a restart purge rate Rpst2 as the duration time of fulfillment of the purge condition lengthens, within a range equal to or smaller than a full purge rate Rpmax that is a purge rate when the drive duty of the purge control valve 65 is 100%. As each of the start purge rate Rpst1 and the restart purge rate Rpst2, a relatively small value is used as the required purge rate Rprq immediately after a changeover from non-fulfilment of the purge condition to fulfillment of the purge condition for the first time, the second time and thereafter during a current trip. The purge condition is stopped from being fulfilled, for example, when an accelerator is turned off to cut off the supply of fuel to the engine 12 during the running of a vehicle mounted with the engine apparatus 10 (when operation control of the engine 12 is interrupted).

Figure 3:
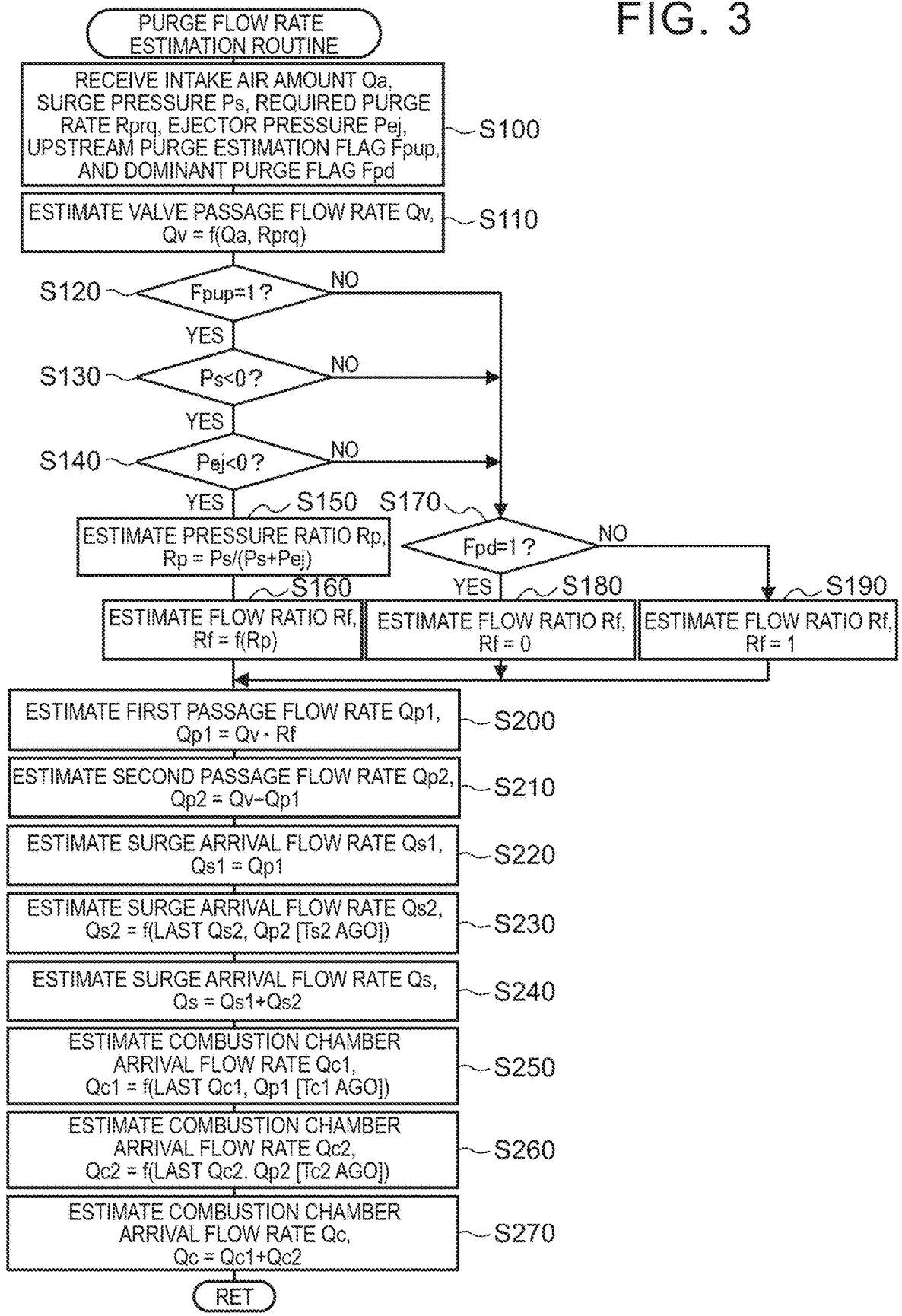
FIG. 3 is a flowchart showing an example of a purge flow rate estimation routine.
Figure 4:
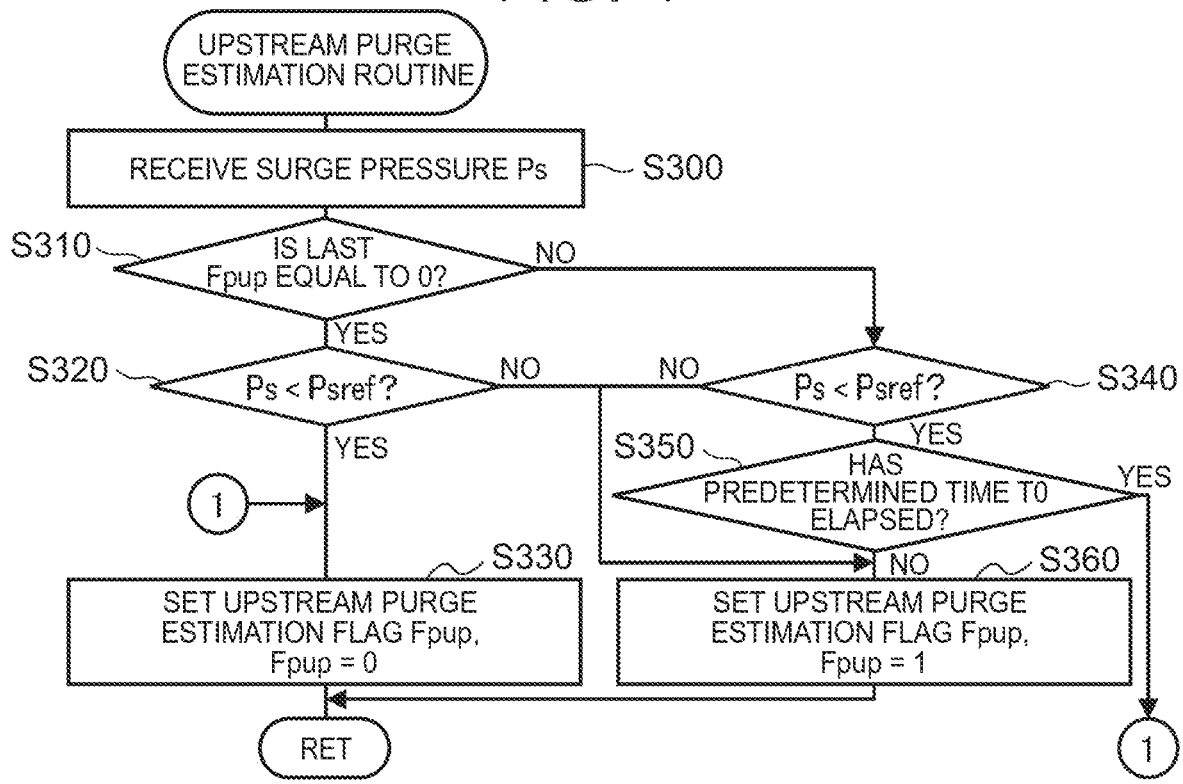
FIG. 4 is a flowchart showing an example of an upstream purge estimation routine.
Figure 5:
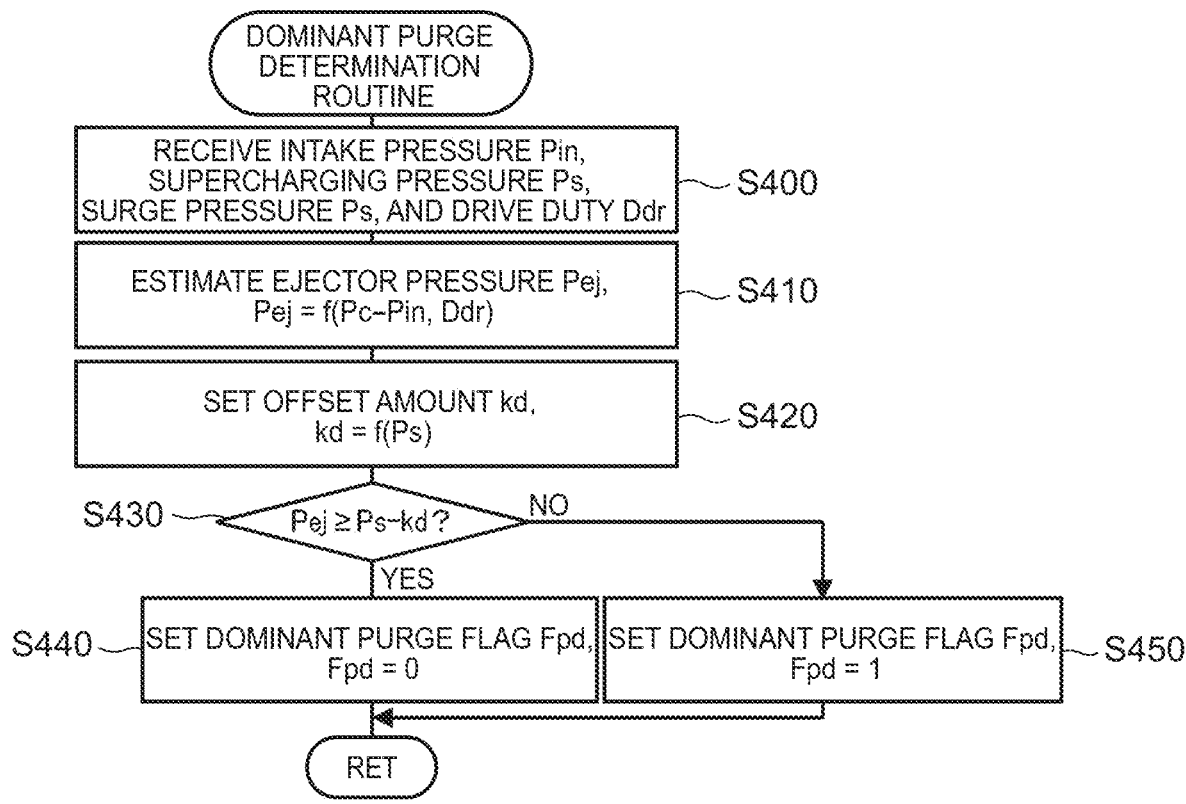
FIG. 5 is a flowchart showing an example of a dominant purge determination routine.

Next, the operation of the engine apparatus 10 of the embodiment thus configured, especially the operation of the engine apparatus 10 in estimating the flow rates (the purge flow rates) of evaporative fuel gas at respective positions (the purge control valve 65, the combustion chamber 30, and the surge tank 27) will be described. FIG. 3 is a flowchart showing an example of a purge flow rate estimation routine, FIG. 4 is a flowchart showing an example of an upstream purge estimation routine for estimating whether or not purge includes upstream purge, and FIG. 5 is a flowchart showing an example of a dominant purge determination routine for determining whether downstream purge or upstream purge is dominant purge. The inclusion of upstream purge in purge means that at least part of the evaporative fuel gas supplied to the combustion chamber 30 is supplied via the second purge passage 63. Results of execution of the routines of FIGS. 4 and 5 are used in the routine of FIG. 3. The routines of FIGS. 3 and 5 are repeatedly executed by the electronic control unit 70 while purge is carried out, and the routine of FIG. 4 is repeatedly executed regardless of whether or not purge is carried out. For the sake of simplification of the following description, an estimation as to whether or not purge includes upstream purge will be described through the use of the upstream purge estimation routine of FIG. 4, a determination on dominant purge will be described through the use of the dominant purge determination routine of FIG. 5, and then an estimation of a purge flow rate based on the results of execution of these routines will be described through the use of the purge flow rate estimation routine of FIG. 3.

The estimation as to whether or not purge includes upstream purge will be described through the use of the upstream purge estimation routine of FIG. 4. When the present routine is executed, the electronic control unit 70 first receives the surge pressure Ps (step S300). It should be noted herein that, as the surge pressure Ps, a value detected by the surge pressure sensor 27a is input to the electronic control unit 70. Subsequently, a value of an upstream purge estimation flag (last Fpup) set at the time of the last execution of the present routine is checked (step S310). It should be noted herein that the upstream purge estimation flag Fpup is set as 1 when purge is estimated to include upstream purge, and is set as 0 when purge is estimated not to include upstream purge (to include only downstream purge). Besides, the upstream purge estimation flag Fpup is set as 0 that is an initial value, when the current trip is started. Incidentally, in the embodiment, the present routine is repeatedly executed regardless of whether or not the purge condition is fulfilled. Therefore, the upstream purge estimation flag Fpup at the time when purge is not carried out assumes a value at the time when it is assumed that purge is carried out.

When the last upstream purge estimation flag (last Fpup) is 0, namely, when purge is estimated not to include upstream purge (to include only downstream purge), the surge pressure Ps and the threshold Psref are compared with each other (step S320). It should be noted herein that the threshold Psref is a threshold used to estimate whether or not purge includes upstream purge, and is determined in advance through an experiment or an analysis. For example, a value of about −6 kPa to −9 kPa is used as the threshold Psref.

When it is determined in step S320 that the surge pressure Ps is lower than the threshold Psref, purge is estimated not to include upstream purge, the upstream purge estimation flag Fpup is set as 0, namely, held equal to 0 (step S330), and the present routine is ended. When it is determined in step S320 that the surge pressure Ps is equal to or higher than the threshold Psref, purge is estimated to include upstream purge, the upstream purge estimation flag Fpup is set as 1, namely, changed over from 0 to 1 (step S360), and the present routine is ended.

When the last upstream purge estimation flag (last Fpup) is 1 in step S310, namely, when purge is estimated to include upstream purge, the surge pressure Ps and the threshold Psref are compared with each other (step S340). When it is determined that the surge pressure Ps is equal to or higher than the threshold Psref, purge is estimated to include upstream purge, the upstream purge estimation flag Fpup is set as 1, namely held equal to 1 (step S360), and the present routine is ended.

When it is determined in step S340 that the surge pressure Ps is lower than the threshold Psref, it is determined whether or not a predetermined time T0 has elapsed since a fall in the surge pressure Ps below the threshold Psref (step S350). The predetermined time T0 will be described later in detail. When it is determined that the predetermined time T0 has not elapsed since a fall in the surge pressure Ps below the threshold Psref, purge is estimated to include upstream purge, the upstream purge estimation flag Fpup is set as 1, namely, held equal to 1 (step S360), and the present routine is ended. When it is determined that the predetermined time T0 has elapsed since a fall in the surge pressure Ps below the threshold Psref, purge is estimated not to include upstream purge, the upstream purge estimation flag Fpup is set as 0, namely, changed over from 1 to 0 (step S330), and the present routine is ended.

The predetermined time T0 is determined through an experiment or an analysis as a difference between a time to the arrival of evaporative fuel gas in the surge tank 27 (the combustion chamber 30) during upstream purge and a time to the arrival of evaporative fuel gas in the surge tank 27 (the combustion chamber 30) during downstream purge. A route volume (a route volume based on almost the entirety of the second purge passage 63 and the intake pipe 23) until the arrival of evaporative fuel gas in the surge tank 27 (the combustion chamber 30) via the second purge passage 63 and the intake pipe 23 during upstream purge is larger than a route volume (a route volume based on the first purge passage 62 and a region of the intake pipe 23 located downstream of the throttle valve 26) until the arrival of evaporative fuel gas in the surge tank 27 (the combustion chamber 30) via the first purge passage 62 and the intake pipe 23 during downstream purge. Therefore, the time to the arrival of evaporative fuel gas in the surge tank 27 (the combustion chamber 30) during upstream purge is longer than the time to the arrival of evaporative fuel gas in the surge tank 27 (the combustion chamber 30) during downstream purge. Accordingly, when the surge pressure Ps falls below the threshold Psref from a value equal to or higher than the threshold Psref, the evaporative fuel gas remaining in the second purge passage 63 and the evaporative fuel gas newly supplied to the first purge passage 62 are assumed to merge together downstream of the throttle valve 26 in the intake pipe 23 and to be supplied to the surge tank 27 (the combustion chamber 30) for a while. In the embodiment, in view of this, when the upstream purge estimation flag Fpup is 1, the upstream purge estimation flag Fpup is changed over to 0 only after the lapse of the predetermined time T0 from the timing when the surge pressure Ps becomes lower than the threshold Psref from a value equal to or higher than the threshold Psref. Thus, it can be more appropriately estimated whether or not purge includes upstream purge.

Figure 6:
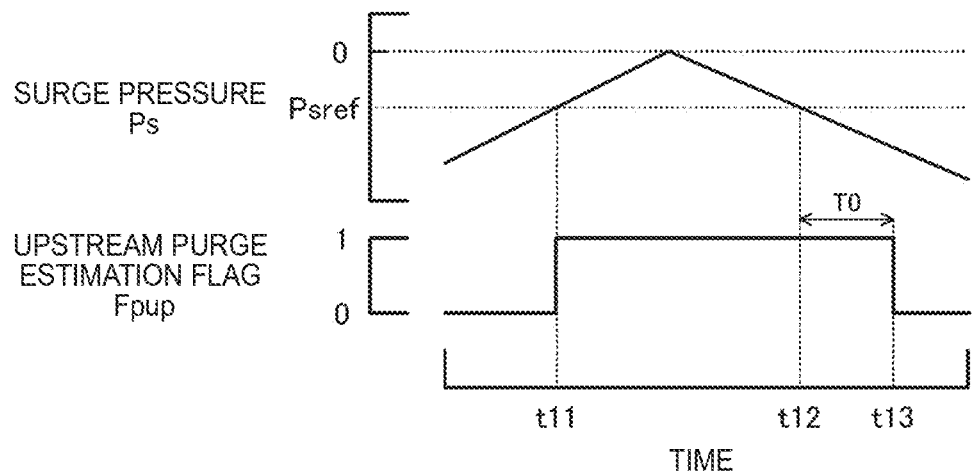
FIG. 6 is an illustrative view showing an example of how a surge pressure Ps and an upstream purge estimation flag Fpup change.

FIG. 6 is an illustrative view showing an example of how the surge pressure Ps and the upstream purge estimation flag Fpup change. As shown in FIG. 6, when the upstream purge estimation flag Fpup is 0 and the surge pressure Ps becomes equal to or higher than the threshold Psref (at a timing t11), the upstream purge estimation flag Fpup is changed over to 1. After that, when the surge pressure Ps becomes lower than the threshold Psref (at a timing t12) and the predetermined time T0 elapses while the surge pressure Ps is lower than the threshold Psref (at a timing t13), the upstream purge estimation flag Fpup is changed over to 0.

Next, the determination on dominant purge will be described through the use of the dominant purge determination routine of FIG. 5. When the present routine is executed, the electronic control unit 70 first receives data on the intake pressure Pin, the supercharging pressure Pc, the surge pressure Ps, the drive duty Ddr, and the like (step S400). It should be noted herein that, as the intake pressure Pin, a value detected by the intake pressure sensor 23b is input to the electronic control unit 70. As the supercharging pressure Pc, a value detected by the supercharging pressure sensor 23c is input to the electronic control unit 70. As the surge pressure Ps, a value detected by the surge pressure sensor 27a is input to the electronic control unit 70. As the drive duty Ddr, a value set in the foregoing purge control is input to the electronic control unit 70.

Figure 7:
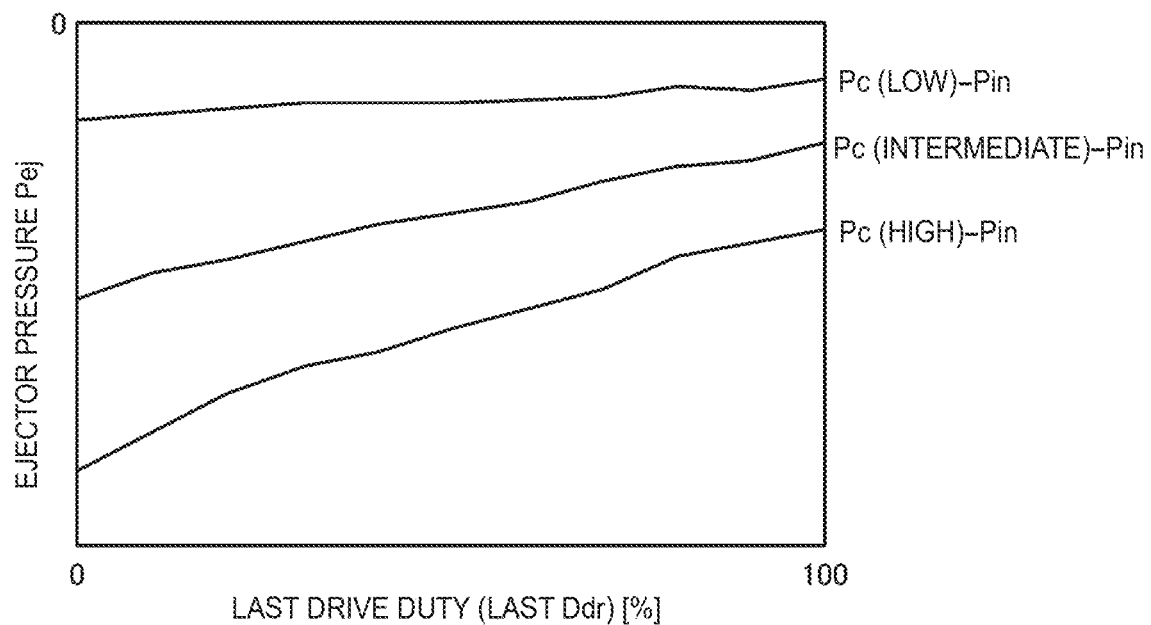
FIG. 7 is an illustrative view showing an example of an ejector pressure setting map.

Upon receiving the data in this manner, the electronic control unit 70 estimates an ejector pressure Pej based on a value obtained by subtracting the intake pressure Pin from the supercharging pressure Pc, and the drive duty Ddr (step S410). It should be noted herein that the ejector pressure Pej can be obtained by applying the value obtained by subtracting the intake pressure Pin from the supercharging pressure Pc, and the drive duty Ddr to an ejector pressure setting map. The ejector pressure setting map is determined in advance through an experiment or an analysis as a relationship among the value obtained by subtracting the intake pressure Pin from the supercharging pressure Pc, the drive duty Ddr, and the ejector pressure Pej, and is stored in a ROM (not shown) or a flash memory (not shown). FIG. 7 is an illustrative view showing an example of the ejector pressure setting map. As shown in FIG. 7, the ejector pressure Pej is set in such a manner as to rise (the absolute value thereof as a negative value decreases) as the drive duty Ddr increases, and to fall (the absolute value thereof as a negative value increases) as the supercharging pressure Pc (a value obtained by subtracting the intake pressure Pin from the supercharging pressure Pc) rises.

Figure 8:
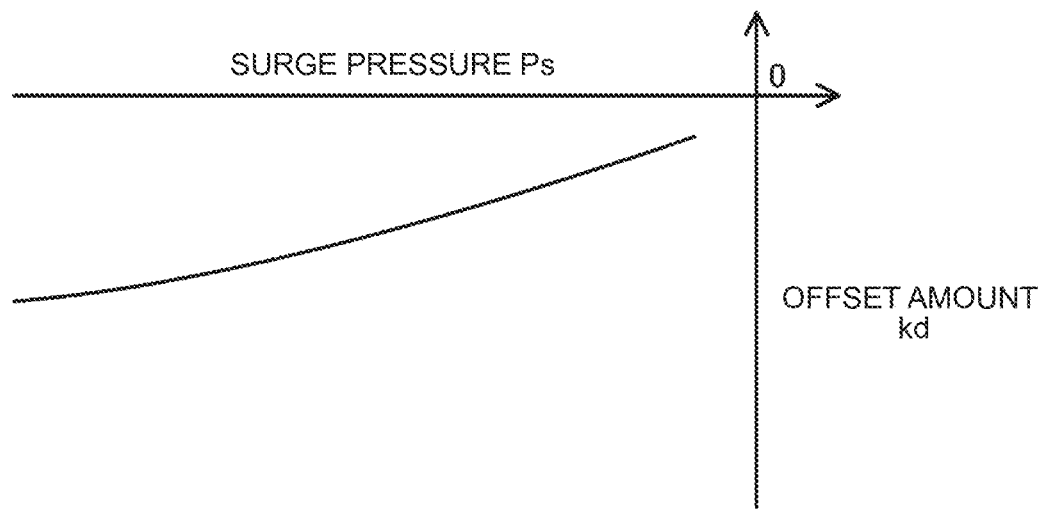
FIG. 8 is an illustrative view showing an example of an offset amount setting map at the time when the cross-sectional area of a second purge passage 63 is smaller than the cross-sectional area of a first purge passage 62.

Subsequently, the electronic control unit 70 sets an offset amount kd for offsetting the surge pressure Ps to correct the influence based on a cross-sectional area of the second purge passage 63 with respect to a cross-sectional area of the first purge passage 62, based on the surge pressure Ps (step S420). It should be noted herein that the offset amount kd can be obtained by applying the surge pressure Ps to an offset amount setting map. The offset amount setting map is determined in advance through an experiment or an analysis as a relationship between the surge pressure Ps and the offset amount kd, and is stored in the ROM (not shown) or the flash memory (not shown). FIG. 8 is an illustrative view showing an example of the offset amount setting map at the time when the cross-sectional area of the second purge passage 63 is smaller than the cross-sectional area of the first purge passage 62. As shown in FIG. 8, the offset amount kd is set such that the absolute value thereof as a negative value increases as the absolute value of the surge pressure Ps as a negative value increases. This is based on the fact that the influence based on the cross-sectional area of the second purge passage 63 with respect to the cross-sectional area of the first purge passage 62 increases as the absolute value of the surge pressure Ps as a negative value increases. Incidentally, in the case where each of the first purge passage 62 and the second purge passage 63 is configured as a pipe, the cross-sectional area thereof is proportional to the square of a pipe diameter thereof. Therefore, the influence based on the cross-sectional area of the second purge passage 63 with respect to the cross-sectional area of the first purge passage 62 can be paraphrased as the influence based on the pipe diameter of the second purge passage 63 with respect to the pipe diameter of the first purge passage 62.

Upon setting the offset amount kd in this manner, the electronic control unit 70 compares the ejector pressure Pej and the value obtained by subtracting the offset amount kd from the surge pressure Ps with each other (step S430).

When it is determined that the ejector pressure Pej is equal to or higher than (the absolute value of the ejector pressure Pej as a negative value is equal to or lower than) the value obtained by subtracting the offset amount kd from the surge pressure Ps, the electronic control unit 70 determines that evaporative fuel gas dominantly flows through the first purge passage 62 (dominant purge is downstream purge), sets a dominant purge flag Fpd as 0 (step S440), and ends the present routine.

When it is determined in step S430 that the ejector pressure Pej is lower than (the absolute value thereof as a negative value is higher than) the value obtained by subtracting the offset amount kd from the surge pressure Ps, the electronic control unit 70 determines that evaporative fuel gas dominantly flows through the second purge passage 63 (dominant purge is upstream purge), sets the dominant purge flag Fpd as 1 (step S450), and ends the present routine.

In the embodiment, as described hitherto, the offset amount kd for correcting the influence based on the cross-sectional area of the second purge passage 63 with respect to the cross-sectional area of the first purge passage 62 is set based on the surge pressure Ps, and the ejector pressure Pej and the value obtained by subtracting the offset amount kd from the surge pressure Ps are compared with each other to determine whether dominant purge is downstream purge or upstream purge. It is thus possible to more appropriately determine whether dominant purge is downstream purge or upstream purge, than in the case where the influence based on the cross-sectional area of the second purge passage 63 with respect to the cross-sectional area of the first purge passage 62 is not taken into account.

Next, the estimation of the purge flow rate will be described through the use of the purge flow rate estimation routine of FIG. 3. When this routine is executed, the electronic control unit 70 first receives data on the intake air amount Qa, the surge pressure Ps, the required purge rate Rprq, the ejector pressure Pej, the upstream purge estimation flag Fpup, the dominant purge flag Fpd, and the like (step S100). It should be noted herein that, as the intake air amount Qa, a value detected by the airflow meter 23a is input to the electronic control unit 70. As the surge pressure Ps, a value detected by the surge pressure sensor 27a is input to the electronic control unit 70. As the required purge rate Rprq, a value set in the foregoing purge control is input to the electronic control unit 70. As the upstream purge estimation flag Fpup, a value set by the upstream purge estimation routine of FIG. 4 is input to the electronic control unit 70. As the dominant purge flag Fpd, a value set by the dominant purge determination routine of FIG. 5 is input to the electronic control unit 70.

Upon receiving the data in this manner, the electronic control unit 70 estimates a valve passage flow rate Qv that is a flow rate (a purge flow rate) of the evaporative fuel gas that has passed through the purge control valve 65, based on the intake air amount Qa and the required purge rate Rprq (step S110). It should be noted herein that the valve passage flow rate Qv can be obtained by applying the intake air amount Qa and the required purge rate Rprq to a valve passage flow rate estimation map. The valve passage flow rate estimation map is determined through an experiment or an analysis as a relationship representing how the intake air amount Qa and the required purge rate Rprq are related to the valve passage flow rate Qv, and is stored in the ROM (not shown) or the flash memory (not shown).

Then, the electronic control unit 70 determines whether or not the upstream purge estimation flag Fpup is 1, namely, whether or not purge is estimated to include upstream purge (step S120), determines whether or not the surge pressure Ps is a negative pressure (step S130), and determines whether or not the ejector pressure Pej is a negative pressure (step S140). Processes of steps S120 to S140 are designed to determine (estimate) whether the evaporative fuel gas that has passed through the purge control valve 65 flows through the first purge passage 62 and the second purge passage 63 (while being distributed depending on the circumstances) or flows through only one of the first purge passage 62 and the second purge passage 63.

When it is determined in step S120 that the upstream purge estimation flag Fpup is 1, namely, that purge is estimated to include upstream purge, it is determined in step S130 that the surge pressure Ps is a negative pressure, and it is determined in step S140 that the ejector pressure Pej is a negative pressure, the electronic control unit 70 determines (estimates) that the evaporative fuel gas that has passed through the purge control valve 65 flows through the first purge passage 62 and the second purge passage 63. At this time, the electronic control unit 70 computes a pressure ratio Rp as a ratio of the surge pressure Ps to the sum of the surge pressure Ps and the ejector pressure Pej (step S150), and estimates a flow ratio Rf based on the computed pressure ratio Rp and a relationship between the cross-sectional area of the first purge passage 62 and the cross-sectional area of the second purge passage 63 (step S160). Then, the electronic control unit 70 estimates a value obtained by multiplying the valve passage flow rate Qv by the flow ratio Rf, as a first passage flow rate Qp1 (step S200), and estimates a value obtained by subtracting the first passage flow rate Qp1 from the valve passage flow rate Qv, as a second passage flow rate Qp2 (step S210).

Figure 9:
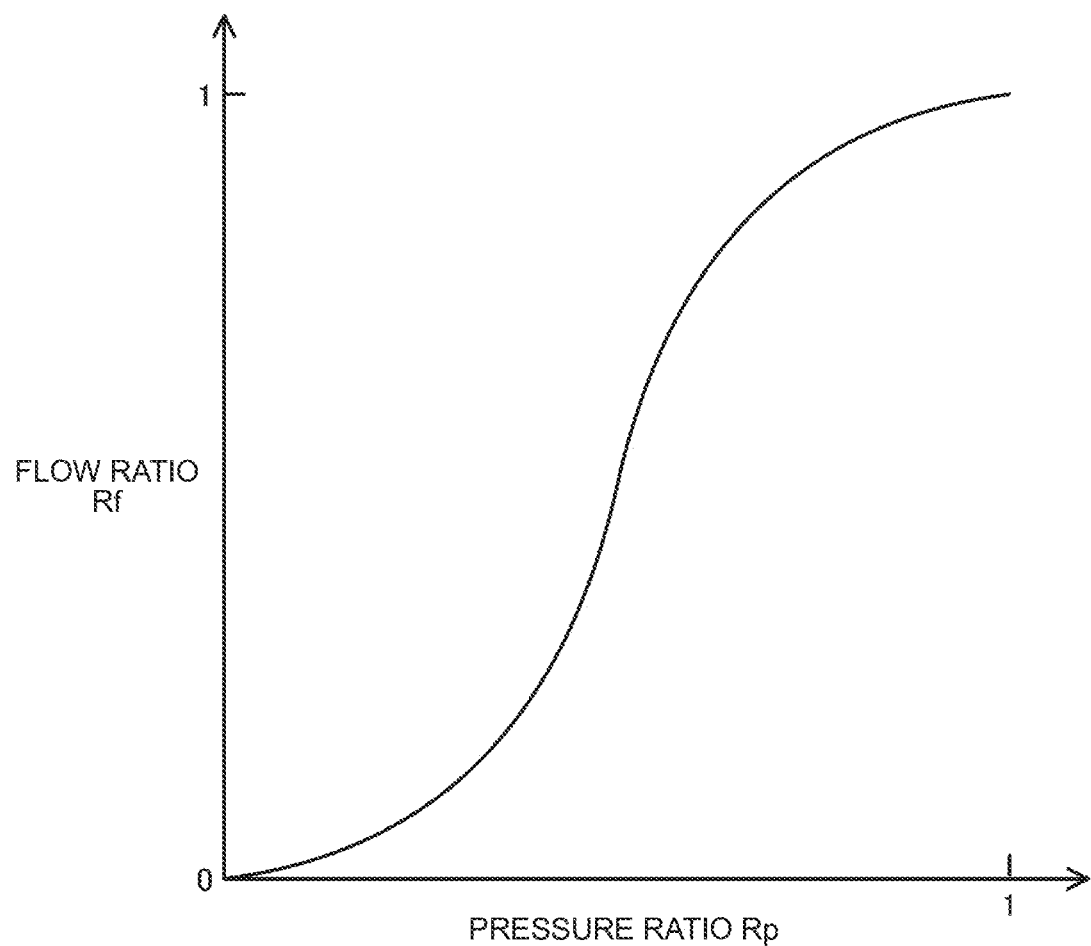
FIG. 9 is an illustrative view showing an example of a flow ratio estimation map at the time when there is a certain relationship between the cross-sectional area of the first purge passage 62 and the cross-sectional area of the second purge passage 63.

It should be noted herein that the first passage flow rate Qp1 and the second passage flow rate Qp2 are flow rates of the evaporative fuel gas flowing through the first purge passage 62 and the second purge passage 63 after passing though the purge control valve 65, respectively. The flow ratio Rf is a ratio of the first passage flow rate Qp1 to the valve passage flow rate Qv (the sum of the first passage flow rate Qp1 and the second passage flow rate Qp2). In the process of step S160, the flow ratio Rf can be obtained by applying the pressure ratio Rp to a flow ratio estimation map. The flow ratio estimation map is determined in advance through an experiment or an analysis as a relationship between the pressure ratio Rp and the flow ratio Rf, and is stored in the ROM (not shown) or the flash memory (not shown). FIG. 9 is an illustrative view showing an example of the flow ratio estimation map at the time when there is a certain relationship between the cross-sectional area of the first purge passage 62 and the cross-sectional area of the second purge passage 63. As shown in FIG. 9, the flow ratio Rf is set in such a manner as to increase within a range lager than 0 and smaller than 1, as the pressure ratio Rp increases within a range lager than 0 and smaller than 1. Moreover, when the cross-sectional area of the first purge passage 62 and the cross-sectional area of the second purge passage 63 are denoted by "S1" and "S2" respectively, the flow ratio Rf increases (approaches 1) as "S1/S2" in FIG. 9 increases, namely, as the likelihood of evaporative fuel gas flowing through the first purge passage 62 increases, and the flow ratio Rf decreases (approaches 0) as "S1/S2" in FIG. 9 decreases, namely, as the likelihood of evaporative fuel gas flowing through the first purge passage 62 decreases.

When it is determined in step S120 that the upstream purge estimation flag Fpup is 0, namely, that purge is estimated not to include upstream purge, when it is determined in step S130 that the surge pressure Ps is not a negative pressure, or when it is determined in step S140 that the ejector pressure Pej is not a negative pressure, the electronic control unit 70 estimates that the entire evaporative fuel gas that has passed through the purge control valve 65 flows through one of the first purge passage 62 and the second purge passage 63, and checks the value of the dominant purge flag Fpd (step S170).

When the dominant purge flag Fpd is 1 in step S170, namely, when dominant purge is upstream purge, the electronic control unit 70 estimates that the entire evaporative fuel gas that has passed through the purge control valve 65 flows through the second purge passage 63, sets the flow ratio Rf as 0 (step S180), and sets the first passage flow rate Qp1 and the second passage flow rate Qp2 through the foregoing processes of steps S200 and S210 (step S210).

When the dominant purge flag Fpd is 0 in step S170, namely, when dominant purge is downstream purge, the electronic control unit 70 estimates that the entire evaporative fuel gas that has passed through the purge control valve 65 flows through the first purge passage 62, sets the flow ratio Rf as 1 (step S190), and estimates the first passage flow rate Qp1 and the second passage flow rate Qp2 through the foregoing processes of steps S200 and S210 (step S210).

Upon estimating the first passage flow rate Qp1 and the second passage flow rate Qp2 in this manner, the electronic control unit 70 estimates a surge arrival flow rate Qs1 that is a flow rate of the evaporative fuel gas that has arrived in the surge tank 27 via the first purge passage 62 and the intake pipe 23 after passing through the purge control valve 65 (step S220). Subsequently, the electronic control unit 70 estimates a surge arrival flow rate Qs2 that is a flow rate of the evaporative fuel gas that has arrived in the surge tank 27 via the second purge passage 63 and the intake pipe 23 after passing through the purge control valve 65 (step S230). Then, the electronic control unit 70 estimates the sum of the surge arrival flow rate Qs1 and the surge arrival flow rate Qs2 as a surge arrival flow rate Qs that is a flow rate of the evaporative fuel gas that has arrived in the surge tank 27 (step S240).

The estimation of the surge arrival flow rates Qs1 and Qs2 will now be described. For the sake of simplification of explanation, the estimation of the surge arrival flow rate Qs2 and the estimation of the surge arrival flow rate Qs1 will be described in this order. As indicated by an equation (1), the surge arrival flow rate Qs2 can be estimated through the use of a surge arrival second flow rate (last Qs2) estimated last time (the interval of execution of the present routine ago), a second passage flow rate Qp2 [Ts2 ago] estimated a time Ts2 ago, and the number of times of smoothing Ts2. The time Ts2 is a time that is required for evaporative fuel gas to arrive in the surge tank 27 via the second purge passage 63 and the intake pipe 23 after passing through the purge control valve 65. The time Ts2 and the number of times of smoothing Ts2 are set in advance through an experiment or an analysis based on the rotational speed Ne, the load factor KL, the surge pressure Ps, and the like of the engine 12. For example, the time Ts2 and the number of times of smoothing Ts2 are set in such a manner as to decrease as the rotational speed Ne of the engine 12 rises, to decrease as the load factor KL of the engine 12 increases, and to decrease as the surge pressure Ps of the engine 12 falls (rises as negative pressure). This is based on the fact that the speed at which evaporative fuel gas travels toward the surge tank 27 (the combustion chamber 30) rises as the rotational speed Ne of the engine 12 rises, as the load factor KL of the engine 12 increases, and as the surge pressure Ps of the engine 12 falls. Incidentally, for the sake of simplicity, constant values determined in advance may be used as the time Ts2 and the number of times of smoothing Ts2 respectively. By estimating the surge arrival flow rate Qs2 in this manner, the surge arrival flow rate Qs2 can be more appropriately (more accurately) estimated in consideration of a route volume (a response delay in the flow of evaporative fuel gas) from the purge control valve 65 to the surge tank 27 via the second purge passage 63.

$$Qs2 = \text{last } Qs2 + (Qp2[Ts2 \text{ ago}] - \text{last } Qs2)/\tau s2 \qquad (1)$$

In the embodiment, the first passage flow rate Qp1 estimated in step S200 is estimated as the surge arrival flow rate Qs1. In this manner, the surge arrival flow rate Qs1 can be easily estimated. This method is especially useful when the route volume from the purge control valve 65 to the surge tank 27 via the first purge passage 62 is small enough to be able to ignore the response delay in the flow of evaporative fuel gas. In the embodiment, the evaporative fuel treatment device 50 (the first purge passage 62) is designed in this manner.

Incidentally, at least one of the surge arrival flow rate Qs1, the surge arrival flow rate Qs2, and the surge arrival flow rate Qs is used for, for example, the foregoing intake air amount control (the control of the throttle valve 26).

Subsequently, the electronic control unit 70 estimates a combustion chamber arrival flow rate Qc1 that is a flow rate of the evaporative fuel gas that has arrived in the combustion chamber 30 via the first purge passage 62 and the intake pipe 23 after passing through the purge control valve 65 (step S250). Subsequently, the electronic control unit 70 estimates a combustion chamber arrival flow rate Qc2 that is a flow rate of the evaporative fuel gas that has arrived in the combustion chamber 30 via the second purge passage 63 and the intake pipe 23 after passing through the purge control valve 65 (step S260). Then, the electronic control unit 70 estimates the sum of the combustion chamber arrival flow rate Qc1 and the combustion chamber arrival flow rate Qc2 as a combustion chamber arrival flow rate Qc that is a flow rate of the evaporative fuel gas that has arrived in the combustion chamber 30 (step S270), and ends the present routine.

It should be noted herein that the combustion chamber arrival flow rate Qc1 can be computed through the use of a combustion chamber arrival first flow rate (last Qc1) estimated last time (the interval of execution of the present routine ago), the first passage flow rate Qp1 [Tc1 ago] estimated a time Tc1 ago, and the number of times of smoothing $\tau c1$, as indicated by an equation (2). The combustion chamber arrival flow rate Qc2 can be estimated through the use of a combustion chamber arrival second flow rate (last Qc2) estimated last time (the interval of execution of the present routine ago), a second passage flow rate Qp2 [Tc2 ago] estimated a time Tc2 ago, and the number of times of smoothing $\tau c2$, as indicated by an equation (3). The time Tc1 is a time required for evaporative fuel gas to arrive in the combustion chamber 30 via the first purge passage 62 and the intake pipe 23 after passing through the purge control valve 65, and the time Tc2 is a time required for evaporative fuel gas to arrive in the combustion chamber 30 via the second purge passage 63 and the intake pipe 23 after passing through the purge control valve 65. The time Tc2 and the number of times of smoothing $\tau c2$ are set longer and larger than the time Tc1 and the number of times of smoothing $\tau c1$ respectively. This is based on the fact that the time required for evaporative fuel gas to arrive in the combustion chamber 30 via the second purge passage 63 and the intake pipe 23 after passing through the purge control valve 65 is longer than the time required for evaporative fuel gas to arrive in the combustion chamber 30 via the first purge passage 62 and the intake pipe 23 after passing through the purge control valve 65. The time Tc1, the time Tc2, the number of times of smoothing τc1, and the number of times of smoothing τc2 are set in advance through an experiment or an analysis based on the rotational speed Ne, the load factor KL, the surge pressure Ps, and the like of the engine 12. For example, the time Tc1, the time Tc2, the number of times of smoothing τc1, and the number of times of smoothing τc2 are set in such a manner as to decrease as the rotational speed Ne of the engine 12 rises, to decrease as the load factor KL of the engine 12 increases, and to decrease as the surge pressure Ps of the engine 12 falls (rises as negative pressure). This is because of the same reason as for the foregoing tendencies of the time Ts2 and the number of times of smoothing τs2. Incidentally, for the sake of simplicity, constant values determined in advance may be used as the time Tc1, the time Tc2, the number of times of smoothing τc1, and the number of times of smoothing τc2 respectively.

$$Qc1 = \text{last } Qc1 + (Qp1[Tc1 \text{ ago}] - \text{last } Qc1)/\tau c1 \quad (2)$$

$$Qc2 = \text{last } Qc2 + (Qp2[Tc2 \text{ ago}] - \text{last } Qc2)/\tau c2 \quad (3)$$

By estimating the combustion chamber arrival flow rates Qc1 and Qc2 in this manner, the combustion chamber arrival flow rates Qc1 and Qc2 can be more appropriately (more accurately) estimated in consideration of a route volume (a response delay in the flow of evaporative fuel gas) from the purge control valve 65 to the combustion chamber 30 via the first purge passage 62 and a route volume (a response delay in the flow of evaporative fuel gas) from the purge control valve 65 to the combustion chamber 30 via the second purge passage 63, respectively. Incidentally, at least one of the combustion chamber arrival flow rate Qc1, the combustion chamber arrival flow rate Qc2, and the combustion chamber arrival flow rate Qc is used for, for example, the foregoing purge control (the control of the purge control valve 65).

Figure 10:
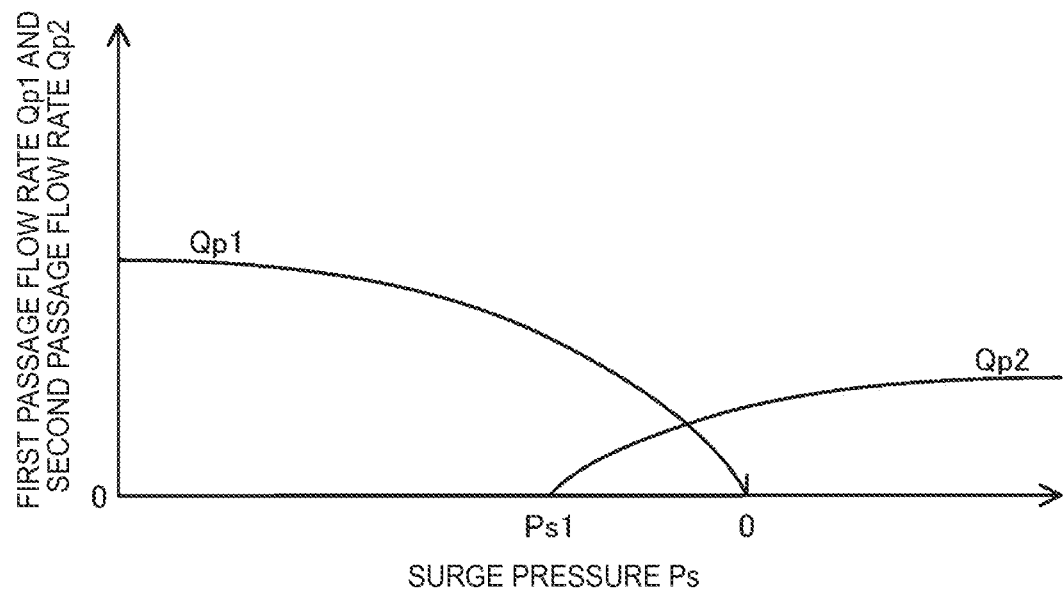
FIG. 10 is an illustrative view showing an example of a relationship representing how the surge pressure Ps is related to a first passage flow rate Qp1 and a second passage flow rate Qp2.

FIG. 10 is an illustrative view showing an example of a relationship representing how the surge pressure Ps is related to the first passage flow rate Qp1 and the second passage flow rate Qp2. In FIG. 10, the area in which the surge pressure Ps is equal to or lower than a negative value Ps1 means an area in which the surge pressure Ps is a negative pressure and the ejector pressure Pej is equal to or higher than 0, the area in which the surge pressure Ps is equal to or higher than 0 means an area in which the surge pressure Ps is equal to or higher than 0 and the ejector pressure Pej is a negative pressure, and the area in which the surge pressure Ps is equal to or higher than a value Ps1 and lower than 0 means an area in which the surge pressure Ps and the ejector pressure Pej are negative pressures. As shown in FIG. 10, in the area in which the surge pressure Ps is equal to or lower than the threshold Ps1 (the area in which the surge pressure Ps is a negative pressure and the ejector pressure Pej is equal to or higher than 0), the entire evaporative fuel gas that has passed through the purge control valve 65 flows through the first purge passage 62. In the area in which the surge pressure Ps is equal to or higher than 0 (the area in which the surge pressure Ps is equal to or higher than 0 and the ejector pressure Pej is a negative pressure), the entire evaporative fuel gas that has passed through the purge control valve 65 flows through the first purge passage 62. In the area in which the surge pressure Ps is higher than the value Ps1 and lower than 0 (in the area in which the surge pressure Ps and the ejector pressure Pej are negative pressures), the evaporative fuel gas that has passed through the purge control valve 65 flows through the first purge passage 62 and the second purge passage 63 (while being distributed depending on the circumstances). In the embodiment, when purge is estimated to include upstream purge and the surge pressure Ps and the ejector pressure Pej are negative pressures, the flow ratio Rf is estimated based on the pressure ratio Rp, the first passage flow rate Qp1 is estimated based on the valve passage flow rate Qv and the flow ratio Rf, and the second passage flow rate Qp2 is estimated by subtracting the first passage flow rate Qp1 from the valve passage flow rate Qv. Thus, when evaporative fuel gas flows through the first purge passage 62 and the second purge passage 63, the first passage flow rate Qp1 and the second passage flow rate Qp2 can be more appropriately estimated.

In the engine apparatus 10 of the embodiment described above, the surge arrival flow rate Qs2 is estimated based on the second passage flow rate Qp2 [Ts2 ago] the time Ts2 ago and the number of times of smoothing τs2, and the sum of the surge arrival flow rate Qs1 and the surge arrival flow rate Qs2 is estimated as the surge arrival flow rate Qs. Thus, the surge arrival flow rate Qs2 can be more appropriately (more accurately) estimated in consideration of the route volume (the response delay in the flow of evaporative fuel gas) from the purge control valve 65 to the surge tank 27 via the second purge passage 63.

In the engine apparatus 10 of the embodiment, when the upstream purge estimation flag Fpup is 1 (purge is estimated to include upstream purge) and the surge pressure Ps and the ejector pressure Pej are negative pressures, the evaporative fuel gas that has passed through the purge control valve 65 is estimated to flow through the first purge passage 62 and the second purge passage 63. However, the evaporative fuel gas that has passed through the purge control valve 65 may be estimated to flow through the first purge passage 62 and the second purge passage 63 when the surge pressure Ps and the ejector pressure Pej are negative pressures, without taking the upstream purge estimation flag Fpup into account.

In the engine apparatus 10 of the embodiment, when the upstream purge estimation flag Fpup is 1 (purge is estimated to include upstream purge) and the surge pressure Ps and the ejector pressure Pej are negative pressures, the flow ratio Rf is estimated based on the pressure ratio Rp and the relationship between the cross-sectional area of the first purge passage 62 and the cross-sectional area of the second purge passage 63. However, the flow ratio Rf may be estimated based on a pressure ratio Rpin, without taking the relationship between the cross-sectional area of the first purge passage 62 and the cross-sectional area of the second purge passage 63 into account.

In the engine apparatus 10 of the embodiment, the first passage flow rate Qp1 is estimated as the surge arrival flow rate Qs1. However, the surge arrival flow rate Qs1 may be estimated through the use of a surge arrival first flow rate (last Qs1) estimated last time (the interval of execution of the purge flow rate estimation routine of FIG. 3 ago), a first passage flow rate Qp1 [Ts1 ago] estimated a time Ts1 ago, and the number of times of smoothing τs1, as indicated by an equation (4). The time Ts1 is a time that is required for evaporative fuel gas to arrive in the surge tank 27 via the first purge passage 62 and the intake pipe 23 after passing through the purge control valve 65. The time Ts1 and the number of times of smoothing τs1 are set in advance through an experiment or an analysis based on the rotational speed Ne, the load factor KL, the surge pressure Ps, and the like of the engine 12. For example, the time Ts1 and the number of times of smoothing τs1 are set in such a manner as to decrease as the rotational speed Ne of the engine 12 rises, to decrease as the load factor KL of the engine 12 increases, and to decrease as the surge pressure Ps of the engine 12 falls (rises as negative pressure). This is because of the same reason as for the foregoing tendencies of the time Ts2 and the number of times of smoothing τs2. Incidentally, for the sake of simplicity, constant values determined in advance may be used as the time Ts1 and the number of times of smoothing τs1 respectively. By estimating the surge arrival flow rate Qs1 in this manner, the surge arrival flow rate Qs1 can be more appropriately (more accurately) estimated in consideration of the route volume (the response delay in the flow of evaporative fuel gas) from the purge control valve 65 to the surge tank 27 via the first purge passage 62.

$$Qs1 = \text{last } Qs1 + (Qp1[Ts1 \text{ ago}] - \text{last } Qs1)/\tau s1 \quad (4)$$

In the engine apparatus 10 of the embodiment, when the upstream purge estimation flag Fpup is 0 (purge is estimated not to include upstream purge), when the surge pressure Ps is not a negative pressure, or when the ejector pressure Pej is not a negative pressure, the flow ratio Rf is set as 0 or 1 based on the dominant purge flag Fpd (whether dominant purge is downstream purge or upstream purge). However, at this time, one of the surge pressure Ps and the ejector pressure Pej is considered to be a negative pressure. Therefore, the flow ratio Rf may be set as 0 or 1 based on the surge pressure Ps and/or the ejector pressure Pej, instead of taking the dominant purge flag Fpd into account.

In the engine apparatus 10 of the embodiment, the first passage flow rate Qp1 and the second passage flow rate Qp2 are estimated based on the valve passage flow rate Qv and the flow ratio Rf, the surge arrival flow rate Qs1 and the combustion chamber arrival flow rate Qc1 are estimated based on the first passage flow rate Qp1, and the surge arrival flow rate Qs2 and the combustion chamber arrival flow rate Qc2 are estimated based on the second passage flow rate Qp2. However, the applicable embodiment is not limited to this as long as the surge arrival flow rates Qs1 and Qs2 and the combustion chamber arrival flow rates Qc1 and Qc2 are estimated based on the valve passage flow rate Qv. For example, the electronic control unit 70 may execute a purge flow rate estimation routine of FIG. 11, instead of the purge flow rate estimation routine of FIG. 3. The routine of FIG. 11 is different from the routine of FIG. 3 in that the processes of steps S120 to S160 are excluded.

In the purge flow rate estimation routine of FIG. 11, upon estimating the valve passage flow rate Qv in step S110, the electronic control unit 70 sets the flow ratio Rf as 0 or 1 based on the dominant purge flag Fpd (steps S170 to S190), and performs the processes starting from step S200. In this case, although the accuracy is lower than in the embodiment, the surge arrival flow rate Qs2 and the combustion chamber arrival flow rates Qc1 and Qc2 can be more appropriately (more accurately) estimated than when the response delay in the flow of evaporative fuel gas is not taken into account. Besides, the surge arrival flow rate Qs1 can be easily estimated as is the case with the embodiment.

In the engine apparatus 10 of the embodiment, the offset amount kd is set based on the surge pressure Ps, and it is determined whether dominant purge is downstream purge or upstream purge, based on the ejector pressure Pej and the value obtained by subtracting the offset amount kd from the surge pressure Ps. However, it may be determined whether dominant purge is downstream purge or upstream purge, based on the ejector pressure Pej and a value obtained by subtracting the offset amount kd that is constant regardless of the surge pressure Ps from the surge pressure Ps. Alternatively, it may be determined whether dominant purge is downstream purge or upstream purge, based on the ejector pressure Pej and the surge pressure Ps (from which the offset amount kd is not subtracted).

In the engine apparatus 10 of the embodiment, the engine 12 is equipped with the in-cylinder injection valve 28 that injects fuel into the combustion chamber 30. However, the engine 12 may be equipped with a port injection valve that injects fuel into the intake port, in addition to or instead of the in-cylinder injection valve 28.

In the engine apparatus 10 of the embodiment, the supercharger 40 is configured as the turbocharger in which the compressor 41 arranged in the intake pipe 23 and the turbine 42 arranged in the exhaust pipe 35 are coupled to each other via the rotary shaft 43. Instead of this turbocharger, however, the supercharger 40 may be configured as a supercharger in which a compressor that is driven by the engine 12 or a motor is arranged in the intake pipe 23.

In the engine apparatus 10 of the embodiment, the common passage 61 is connected to the introduction passage 52 in the vicinity of the canister 56, in the evaporative fuel treatment device 50. However, the common passage 61 may be connected to the canister 56.

In the embodiment, the engine apparatus 10 is configured to be mounted in common automobiles and various hybrid automobiles. However, the engine apparatus 10 may be configured to be mounted in vehicles other than automobiles, or may be configured to be mounted in nonmobile facilities such as construction facilities.

A corresponding relationship between the main elements of the embodiment and the main elements of the present disclosure mentioned in the section of means for solving the problem will be described. In the embodiment, the engine 12 is equivalent to "the engine", the supercharger 40 is equivalent to "the supercharger", the evaporative fuel treatment device 50 is equivalent to "the evaporative fuel treatment device", and the electronic control unit 70 is equivalent to "the control device".

Incidentally, the corresponding relationship between the main elements of the embodiment and the main elements of the present disclosure mentioned in the section of means for solving the problem is an example for concretely illustrating the mode for carrying out the present disclosure mentioned in the section of means for solving the problem by the embodiment, and hence is not intended to limit the elements of the present disclosure mentioned in the section of means for solving the problem. That is, the present disclosure mentioned in the section of means for solving the problem should be interpreted based on what is described in the section, and the embodiment is nothing more than a concrete example of the present disclosure mentioned in the section of means for solving the problem.

Although the mode for carrying out the present disclosure has been described above using the embodiment, it is obvious that the applicable embodiment is not limited at all to this embodiment, and can be carried out in various modes within such a range as not to depart from the gist of the present disclosure.

The present disclosure can be utilized in industries for manufacturing engine apparatuses, and the like.

What is claimed is:
1. An engine apparatus comprising:
   an engine that has a throttle valve arranged in an intake pipe, and that outputs motive power through explosive combustion in a combustion chamber through use of fuel supplied from a fuel tank;

a supercharger that has a compressor arranged upstream of the throttle valve in the intake pipe;
an evaporative fuel treatment device that has
a supply passage through which evaporative fuel gas containing evaporative fuel produced in the fuel tank is supplied to the intake pipe in such a manner as to branch off into a first purge passage and a second purge passage, the first purge passage being connected to the intake pipe downstream of the throttle valve,
an ejector having an intake port that is connected to a recirculation passage extending from the intake pipe between the compressor and the throttle valve,
an exhaust port that is connected to the intake pipe upstream of the compressor, and
a suction port that is connected to the second purge passage, and a purge control valve provided in the supply passage; and
a control device, wherein
the control device is configured to
estimate a first arrival flow rate that is a flow rate of the evaporative fuel gas that has arrived in a throttle downstream portion located downstream of the throttle valve in the intake pipe, via the second purge passage, after passing through the purge control valve, based on
a valve passage flow rate that is a flow rate of the evaporative fuel gas that has passed through the purge control valve, and
a first response delay in flow of the evaporative fuel gas through a route extending from the purge control valve to the throttle downstream portion via the second purge passage,
estimate a second arrival flow rate that is a flow rate of the evaporative fuel gas that has arrived in the throttle downstream portion via the first purge passage after passing through the purge control valve, based on
the valve passage flow rate, and
a second response delay in flow of the evaporative fuel gas through a route extending from the purge control valve to the throttle downstream portion via the first purge passage,
estimate a third arrival flow rate that is a flow rate of the evaporative fuel gas that has arrived in the combustion chamber via the first purge passage after passing through the purge control valve, based on
the valve passage flow rate, and
a third response delay in flow of the evaporative fuel gas through a route extending from the purge control valve to the combustion chamber via the first purge passage, and
estimate a fourth arrival flow rate that is a flow rate of the evaporative fuel gas that has arrived in the combustion chamber via the second purge passage after passing the purge control valve, based on
the valve passage flow rate, and
a fourth response delay in flow of the evaporative fuel gas through a route extending from the purge control valve to the combustion chamber via the second purge passage.

2. The engine apparatus according to claim 1, wherein the control device is configured to, when the evaporative fuel gas that has passed through the purge control valve is branched to flow through the first purge passage and the second purge passage, estimate a second passage flow rate that is a flow rate of the evaporative fuel gas flowing through the second purge passage after passing through the purge control valve, based on
a relationship between a post-throttle pressure that is a pressure in the throttle downstream portion and an ejector pressure that is a pressure at the suction port of the ejector, and
the valve passage flow rate, and
estimate the first arrival flow rate based on the second passage flow rate and the first response delay.

3. The engine apparatus according to claim 1, wherein the control device is configured to, when the evaporative fuel gas that has passed through the purge control valve is branched to flow through the first purge passage and the second purge passage,
estimate a first passage flow rate and a second passage flow rate that are flow rates of the evaporative fuel gas flowing through the first purge passage and the second purge passage respectively after passing through the purge control valve, based on
a relationship between a post-throttle pressure that is a pressure in the throttle downstream portion and an ejector pressure that is a pressure at the suction port of the ejector, and
the valve passage flow rate,
estimate the third arrival flow rate based on the first passage flow rate and the third response delay, and
estimate the fourth arrival flow rate based on the second passage flow rate and the fourth response delay.

4. The engine apparatus according to claim 2, wherein the control device is configured to estimate that the evaporative fuel gas that has passed through the purge control valve is branched to flow through the first purge passage and the second purge passage, when the post-throttle pressure and the ejector pressure are negative pressures.

5. An engine apparatus, comprising:
an engine that has a throttle valve arranged in an intake pipe, and that outputs motive power through explosive combustion in a combustion chamber through use of fuel supplied from a fuel tank;
a supercharger that has a compressor arranged upstream of the throttle valve in the intake pipe;
an evaporative fuel treatment device that has
a supply passage through which evaporative fuel gas containing evaporative fuel produced in the fuel tank is supplied to the intake pipe in such a manner as to branch off into a first purge passage and a second purge passage, the first purge passage being connected to the intake pipe downstream of the throttle valve,
an ejector having an intake port that is connected to a recirculation passage extending from the intake pipe between the compressor and the throttle valve,
an exhaust port that is connected to the intake pipe upstream of the compressor, and
a suction port that is connected to the second purge passage, and a purge control valve provided in the supply passage; and
a control device,
wherein
the control device is configured to
estimate a first arrival flow rate that is a flow rate of the evaporative fuel gas that has arrived in a throttle downstream portion located downstream of the throttle valve in the intake pipe, via the second purge passage, after passing through the purge control valve, based on
  a valve passage flow rate that is a flow rate of the evaporative fuel gas that has passed through the purge control valve, and
  a first response delay in flow of the evaporative fuel gas through a route extending from the purge control valve to the throttle downstream portion via the second purge passage, and the control device is configured to
  estimate a third arrival flow rate that is a flow rate of the evaporative fuel gas that has arrived in the combustion chamber via the first purge passage after passing through the purge control valve, based on
    the valve passage flow rate, and
    a third response delay in flow of the evaporative fuel gas through a route extending from the purge control valve to the combustion chamber via the first purge passage, and
  estimate a fourth arrival flow rate that is a flow rate of the evaporative fuel gas that has arrived in the combustion chamber via the second purge passage after passing the purge control valve, based on
    the valve passage flow rate, and
    a fourth response delay in flow of the evaporative fuel gas through a route extending from the purge control valve to the combustion chamber via the second purge passage.

6. The engine apparatus according to claim 5, wherein
the control device is configured to, when the evaporative fuel gas that has passed through the purge control valve is branched to flow through the first purge passage and the second purge passage,
  estimate a first passage flow rate and a second passage flow rate that are flow rates of the evaporative fuel gas flowing through the first purge passage and the second purge passage respectively after passing through the purge control valve, based on
    a relationship between a post-throttle pressure that is a pressure in the throttle downstream portion and an ejector pressure that is a pressure at the suction port of the ejector, and
    the valve passage flow rate,
  estimate the third arrival flow rate based on the first passage flow rate and the third response delay, and
  estimate the fourth arrival flow rate based on the second passage flow rate and the fourth response delay.

* * * * *